Figure 1:
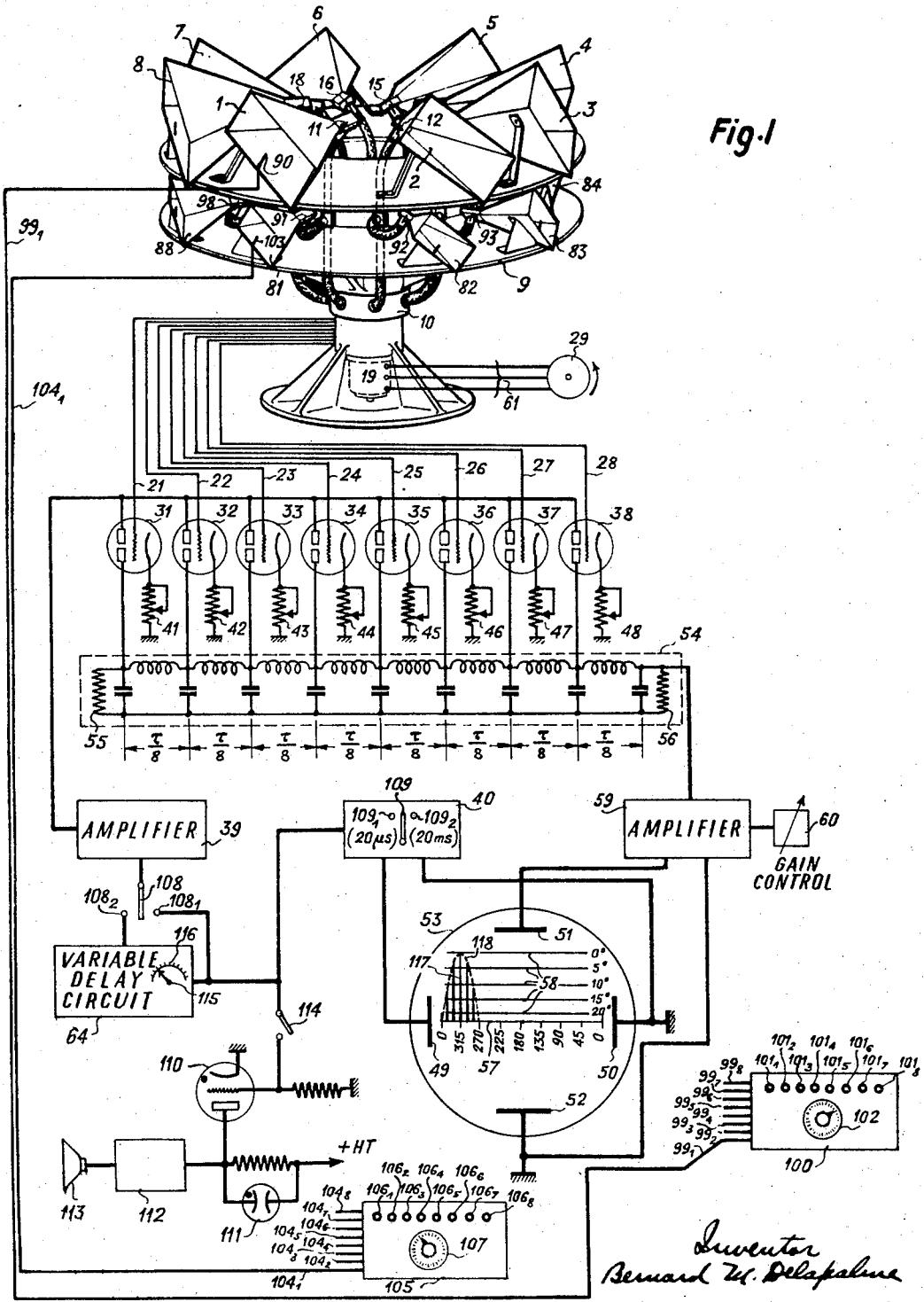

Sept. 2, 1969

B. M. DELAPALME 3,465,342

RADIO DIRECTION-FINDING RECEIVER FOR
THE DETECTION OF RADAR APPARATUS

Filed May 4, 1953

2 Sheets-Sheet 1

Inventor
Bernard M. Delapalme
By Bernie Edmund Morton Bierman & Taylor
attys.

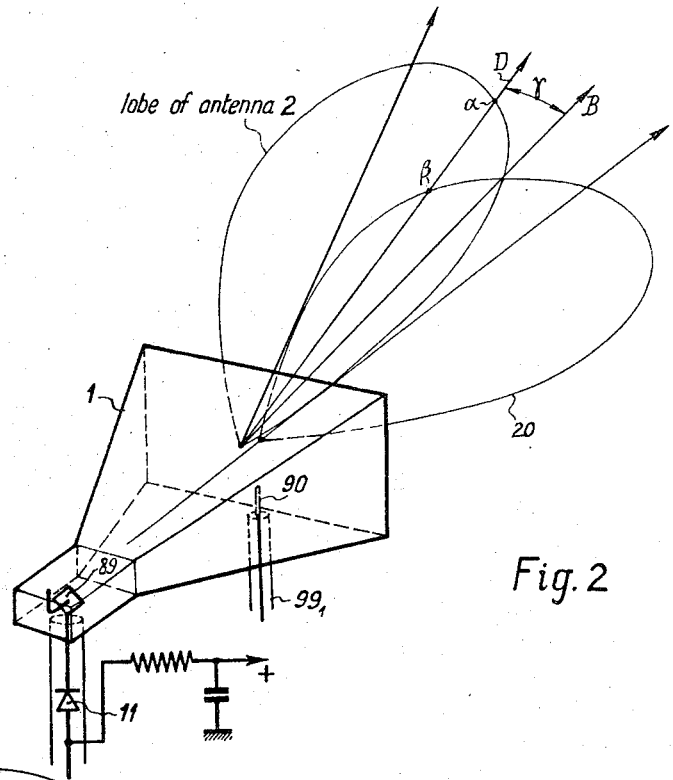
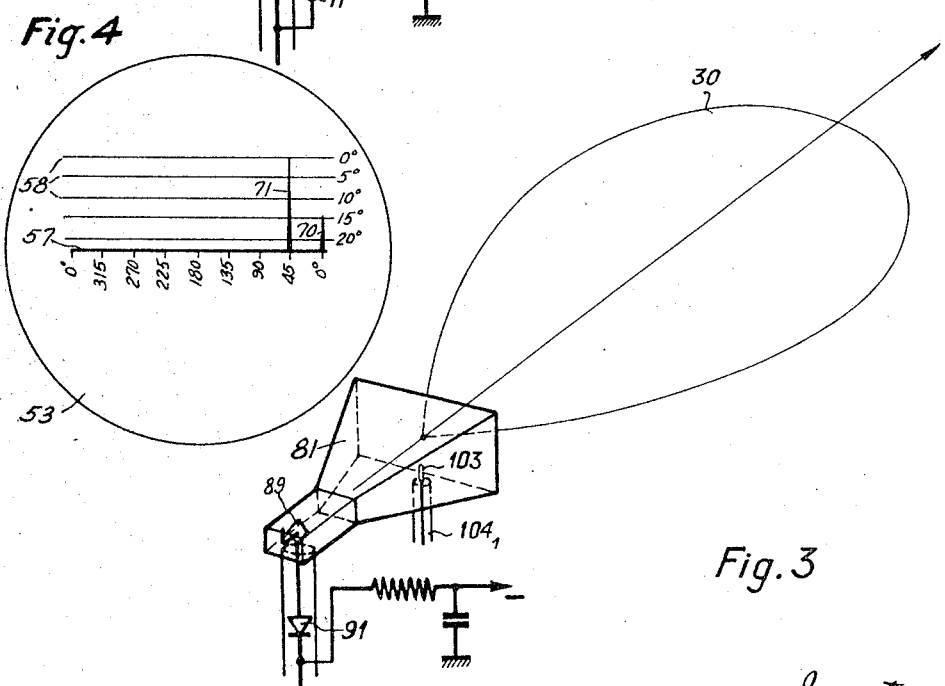

United States Patent Office 3,465,342
Patented Sept. 2, 1969

3,465,342
RADIO DIRECTION-FINDING RECEIVER FOR THE DETECTION OF RADAR APPARATUS
Bernard M. Delapalme, 12 Rue Montrosier, Nueilly-sur-Seine, France
Filed May 4, 1953, Ser. No. 352,670
Claims priority, application France, May 6, 1952, 628,223; Feb. 2, 1953, 51,729
Int. Cl. G01s 5/02
U.S. Cl. 343—113                    9 Claims The present invention relates to a direction-finding radio receiver or goniometer for the detection of radar apparatus and the determination of their transmitted signal characteristics.

It is an object of the present invention to provide a device of this kind which makes it possible to determine the angular location of a radar set with respect to the detection station at which the device is located and also to determine the carrier frequency, pulse repetition rate and antenna pattern of the radar.

The direction finder of the invention includes a number of substantially identical microwave antennas mounted on a rotating horizontal platform, preferably at the angles of a regular polygon, and separated one from another by a known angular distance. The directive pattern of these antennas has in the horizontal plane an angle which is double this angular separation, and the platform is susceptible of rotation through an angle at least as great as this angular separation. For example if eight equiangularly disposed antennas are provided for observation of the whole horizon, their angular separation is 45°, the angle of their patterns is 90°, and the platform is constructed to turn through an angle of at least 45°.

The pulses from a radar to be investigated, as received by two adjacent antennas, are applied simultaneously as trigger pulses to the horizontal sweep circuit of a type A indicator and are also applied as vertical deflection pulses to the same indicator tube after being subjected to separate delays characteristic of each antenna. In this way two pips are obtained whose abscissae on the screen of the indicator are specified for each antenna and whose heights are proportional to the radius vectors, along the bearing of the radar being examined, on the patterns of the receiving antennas from which they are derived. Upon adjustment of the height of the larger of the two pips to a fixed standard, the difference in height between the two pips varies inversely with the angular separation between the direction of the axis of the pattern of the receiving antenna corresponding to the larger pip and the bearing of the radar.

In a preferred embodiment, the direction-finding apparatus of the invention includes two groups or pluralities of directive receiving antennas covering separate bands of frequencies, and the crystals or other detecting devices, one for each antenna, which detect the energy collected by these two pluralities of antennas are reversely connected as between the two groups of antennas so that the video frequency pulses derived from the antennas of one group are of polarity opposite to the video frequency pulses derived from the antennas of the other group. The outputs from the two antennas therefore give rise to oppositely directed pips on the indicator.

The sweep circuit for the indicator provides two sweeps of different lengths or time durations, the shorter being less than the anticipated pulse period of the radars to be detected in order that a new sweep may be initiated by each of the received pulses. The longer sweep on the other hand is much longer than this recurrence period so that when the radar transmitting antenna, which is assumed to be rotating, sweeps across the location of apparatus of the invention, there will appear on the indicator screen a number of pips corresponding to successive pulses transmitted by the radar, each pip displaying on the indicator an amplitude proportional to the radius vector on the radar transmitter antenna pattern of the bearing of the receiving station where the direction finder of the invention is located.

A variable delay circuit preceding the indicator sweep circuit makes it possible to delay by a variable amount the received pulses which trigger the sweep. By regulating the amount of delay inserted by this circuit so that the sweep triggering pulses of zero delay and those of a fixed delay produce sweeps on both of which the position of the pips from a single receiving antenna are identical, it is possible to determine the pulse repetition rate of the radar under observation.

The receiving antennas may for example take the form of electromagnetic horns having each disposed adjacent thereto a small auxiliary antenna fed from a variable frequency oscillator. When this variable frequency is made equal to the carrier frequency of the radar under observation, the pips observed on the cathode-ray tube screen of the indicator undergo an increase in amplitude so that the carrier frequency of the radar may be determined.

Other characteristics and advantages of the apparatus of the invention will become clear from the following detailed description to be taken in conjunction with the accompanying drawings in which:

FIG. 1 is a schematic diagram of one form of apparatus according to the invention;

FIGS. 2 and 3 are schematic views of horns which may be used as receiving antennas for low and high frequency microwave bands respectively and of the crystal detectors associated therewith, illustrating the opposite sense of connection of the crsytals thereto which results in detection in reversed polarity of the pulses received by the antennas of the two groups, and FIG. 4 is a diagram illustrating the appearance of the indicator screen in the apparatus of FIG. 1 when the apparatus is employed for bearing determination.

Referring to FIG. 1, two groups each of eight directive microwave receiving antennas are shown bearing reference characters 1–8 for the first group and 81–88 for the second group. By way of example only the antennas are shown as being of the electromagnetic horn type. The antennas 1–8 and 81–88 are mounted on a rotating horizontal platform 9. The antennas 1–8 may for example be dimensioned to receive radiation in the 10 cm. band, and the antennas 81–88 may for example be dimensioned for reeciving radiation in the 3 cm. band. The antennas of each group are disposed at the angles of a regular octagon, and they have for the mid-frequency of their bands a pattern having an angle of 90°. The antennas are supported with the axis of their patterns at equal angular intervals of 45°, one half the maximum angle of their patterns. The directivity patterns for the antennas of the two groups are indicated by means of reference characters 20 and 30 in FIGS. 2 and 3. The two groups of antennas are mounted on the platform at two different levels and may be so mounted that the patterns of the horns 1 and 81 coincide angularly, i.e., have their axes parallel, and so that the patterns of the horns 2 and 82 similarly coincide, etc. The sides of the horns may be inclined at 45° with respect to the horizontal, for example, in order to make possible reception of both horizontally and vertically polarized waves.

Each horn is connected to a wave guide stub within which is placed a probe 89 which feeds a crystal detector. The crystal detectors are identified by reference characters 11–18 for the antennas of the first group and by reference characters 91–98 for those of the second group.

Detectors 11 and 91 associated respectively with the antenna 1 and the antenna 81 are connected in opposite senses as is indicated in FIGS. 2 and 3. For this reason a pulse received by the atenna 1 will after detection possess a positive polarity whereas a pulse received by the antenna 81 will after detection exhibit a negative polarity. This arrangement avoids the necessity for a switching device which would otherwise be necessary upon changeover from the 10 to the 3 cm. band. Instead the pulses received in the two bands are identifiable by the polarity which they exhibit after detection.

At the mouth of each of the antennas 1–8, there is located a small antenna or radiating element 90 connecting through one of eight coaxial lines $99_1$–$99_8$ to an oscillator 100 of variable frequency covering the 10 cm. range of frequencies to be received by the antennas 1–8. The connections may be made in practice through a rotating joint 10, but have been shown as direct connections in the figure, for simplicity. Similarly there is provided at the mouth of each of the antennas 8–88 a small antenna 103 connecting via one of the coaxial lines $104_1$–$104_8$ to a variable frequency oscillator 105 covering the 3 cm. wavelength range of antennas 81–88.

The output of the oscillator 100 may be connected to any one of the lines $99_1$ to $99_8$, feeding the antennas 90 at the receiving antennas 1–8 by pressing on an appropriate button $101_1$–$101_8$ of oscillator 100. Reference character 102 designates a control making possible change in the frequency of the oscillator 100.

The output of the oscillator 105 may similarly be connected to any one of the lines $104_1$–$104_8$ by pressing on the appropriate button $106_1$–$106_8$. Reference character 107 designates a control for varying the frequency of oscillator 105.

The output connections of the crystal detectors 11–18 and 91–98 are connected together in pairs, those of 11 and 91 in one pair, and so on, and the junctions so established are separately connected via the rotating joint 10 and eight coaxial lines 21–28 to the grids of eight amplifying tubes 31–38 which may for example take the form of double triodes.

The cathode circuits of these tubes include variable resistances 41–48 which make possible separate regulation of the gain of each tube in order to compensate for variations in tube characteristics and in the attenuation introduced by the lines 21–28.

The plates of the upper halves of tubes 31–38 are connected in parallel to the input of a video frequency amplifier 39, and the output of this amplifier may be connected via a two-positon switch 108 alternatively to a variable delay circuit 64 and to a sawtooth generator 40. The output of the sawtooth generator is connected to the horizontal deflection plates 49 and 50 of a cathode-ray tube 53.

The delay introduced by the circuit 64 is adjusted by means of the control 115 and may be read from a scale 116. The sweep circuit 40 produces two sweeps, one for example of 20 microseconds and the other of 20 milliseconds duration. Selection between the two sweeps is made by means of the switch 109 having two positions $109_1$ and $109_2$.

A thyratron 110 may be connected to the output of the amplifier 39 through the switch 114, either directly or through the circuit 64, according to the position of switch 108. The thyratron feeds a neon lamp 111 and a low frequency amplifier 112 which is connected to a loudspeaker 113 by means of which the pulse repetition rate of a radar under observation may be approximately judged.

The plates of the lower halves of tubes 31–38 are connected to a series of contact terminals disposed along the length of a delay line 54 which is terminated at its ends by impedances 55 and 56 equal to the characteristic impedance of the line. One end of line 54 is connected to the input of a video frequency amplifier 59 having a gain control 60 whose output is connected to the vertical deflection plates 51 and 52 of cathode-ray tube 53.

The delay $\tau$ between the ends of the delay line 54 is made equal to the short sweep time of the sweep circuit 40 and is divided into eight equal parts $\tau/8$ (for the eight antennas of the example under consideration) between each pair of successive connections to the lower plates of tubes 31–38. Thus if the short sweep has a length of 20 μsec., $$\tau = 20 \ \mu sec.$$

The face of the cathode-ray tube screen may be inscribed with a first line 57 graduated in degrees from 0 to 360. In the absence of any voltage applied to the vertical deflection plates, the spot formed by the cathode-ray beam is swept along the axis 57. A number of additional lines 58 may be scribed on the face of the tube, parallel to the axis 57 and marked with indications in degrees from 0 to 20 as indicated in the figure. The significance of these identifications will be presently explained.

The horizontally rotating platform 9 is linked to a motor 19 mounted on its axis, and the motor may be remotely controlled via the line 61 and a self-synchronous transmitter 29. The platform is susceptible of rotation through at least 45°, the angular separation of the directivity patterns of any two adjacent antennas of either low or high frequency groups.

The operation of the direction-finding apparatus of the invention is as follows: Referring to FIG. 2, which shows the relative positions of the patterns of antennas 1 and 2, and assuming for example a radar in the 10 cm. band, when a pulse arrives from bearing D with respect to the location of the apparatus, it will be received by two adjacent antennas, for example numbers 1 and 2, with amplitudes respectively proportional to $O\beta$ and $O\alpha$, in which O represents the field strength of the received signal at the location of the apparatus and in which $\alpha$ and $\beta$ are respectively the radii vector of the bearing D on the patterns of antennas 2 and 1, referred for example to unity as the length of the radius vector on both patterns along their axes.

The high frequency pulses picked up by antennas 1 and 2 are detected by the crystal detectors 11 and 12, and the video frequency pulses so developed are then applied to the grids of tubes 31 and 32.

The video frequency pulses as amplified by the upper halves of these tubes and by amplifier 39 trigger the horizontal sweep in the cathode-ray tube 53, switch 108 being connected to terminal $108_1$ leading directly to the sweep circuit 40 and switch 109 being at the position $109_1$ for generation of the short sweep.

The detected pulses as amplified by the lower halves of tubes 31 and 32 are applied respectively to the first and second terminals of delay line 54, counting from the left end which is remote from amplifier 59. Upon emerging from line 54 they pass to the amplifier 59 and hence to the vertical deflection plates of tube 53. The video pulse from antenna 1 applied to the first contact terminal of delay line 54 arrives at the vertical deflection plates of tube 53 with a delay of $8\tau/8$ with reference to the start of the sweep and with an amplitude proportional to $O\beta$, whereas the video pulse from antenna 2 applied to the second delay line terminal has on plates 51 and 52 a delay of $7\tau/8$ with respect to the start of the sweep and amplitude proportional to $O\alpha$. The first pulse gives rise to a pip 70 (FIG. 4) of abscissa 0° and the second to a pip 71 of abscissa 45° (the sweep being assumed to progress from right to left). The difference in height between the two pips is proportional to $\alpha - \beta$. By varying the gain of the amplifier 59, the height of the larger pip 71 is brought to the horizontal line 58 marked "0°." The top of the smaller pip 70 will then approximately intersect one of the other horizontal lines 58, for example that marked "15°." The bearing D of the radar which is known to lie between 0 and 45° is therefore equal to 45°−15°=30°.

The direction finder of the invention permits measurements of bearing to an accuracy of a few degrees of angle. A change in bearing of one degree of the radar under observation with respect to the receiving system gives a change in the height of the pips observed of the order of 3 mm. on a tube 15 cm. in diameter. However it must be borne in mind that the directivity pattern of the horn antennas varies with the carrier frequency of the pulses received and that consequently the relation between the heights of the major and minor pips varies with this frequency, which is unknown. The correctness of the direction D determined may be checked in the following manner: The platform 9 is rotated by means of the synchro transmitter 29 until the two pips are of equal height, i.e., until the radius vector B bisecting the angle between the patterns of the horn antennas 1 and 2 coincides with the bearing D of the radar transmitter under observation. If prior to such adjustment of the platform, the two pips 70 and 71 are respectively at 0 and 45° along the length of axis 57 so that the antennas 1 and 2 are those involved in reception of the signal observed, the radius vector B will make an angle of 22°30′ with respect to the prime direction which is the axis of the pattern of antenna 1.

If the angle through which the platform must be rotated in order to achieve equality of the pips is designated as $\gamma$, the azimuth of the bearing D is $\gamma+22°30′$, and one should have the relation $\gamma=30°-22°30′=7°30′$.

If the switch 114 is closed during the observation, the video frequency pulses received will bring the thyratron 110 into conduction and will cause flashing of the neon tube 111 and operation of the loudspeaker 113 in a fashion which will give an approximate idea of the repetition rate of the received pulses.

By turning the platform so as to bring the axis of a horn antenna across the bearing of the radar under investigation, one of the two pips is caused to disappear. In the remainder of the description now to be given it will be assumed that the apparatus has been so adjusted.

The repetition rate of the radar under investigation is determined in the following manner: The angular graduations along the axis 57 at which appears the pip from the pulses received by one antenna is noted with the switches 108 and 109 connected respectively to terminal $108_1$ and position $109_1$. Switch 108 is then thrown to terminal $108_2$, and the delay introduced by the circuit 64 is adjusted until the pip reappears at the same position along the axis 57. The delay introduced is then read from the scale 116, and the repetition frequency is the reciprocal of this delay. Previously, with switch 108 on terminal $108_1$, the sweep was triggered by the undelayed pulses and the pip was formed by the pulses after a delay peculiar to the antenna involved because of the connection of the associated amplifier tube into the delay line 54. If now the sweep trigger pulses are delayed by a time equal to that which separates successive pulses, the sweep signal will again have the same phase with respect to the pulses applied to the vertical deflection plates, and the pip will appear at the same position.

The shape of the radar transmitter antenna pattern is determined as follows: Switches 108 and 109 are connected respectively to terminal $108_1$ and to position $109_2$ as indicated in FIG. 1. The sweep length is accordingly 20 milliseconds. When the rotating beam of the radar passes over the receiving antenna involved (i.e., the antenna the axis of whose pattern is directed at the radar, as indicated by the fact that reception is obtained from one antenna only, one pip on the short sweep), there appears on the screen a series of pips 117 of amplitudes proportional to the radius vector of the radar transmitter antenna pattern as received by the receiving antenna at the time of the reception of the successive pips. The envelope 118 of the pips therefore reproduces the directivity pattern of the radar transmitter antenna in Cartesian coordinates comprising a polar angle as abscissa and radius vector as ordinate. The appearance of the indicator screen upon the making of this determination is diagrammatically indicated in FIG. 1. By counting the number of pips, the number of pulses in the radar beam may be determined, i.e., the number of pulses applied to a target during one rotation of the radar transmitter antenna.

Moreover the separation between the successive pips 117 is proportional to the repetition rate thereof. If $n$ denotes the number of pips appearing over a fraction of, say, half the sweep, corresponding to an interval of 10 milliseconds, the time interval in milliseconds between two successive pulses, i.e., the pulse cycle, approximately, is equal to the quotient of 10 milliseconds divided by $n$ and the repetition frequency is $100n$ in cycles per second. The repetition rate being thus approximately determined, its precise value is determined according to the procedure above-described.

The carrier frequency of the radar is determined as follows: The upward or downward sense of the pips appearing on the screen of tube 53 indicates as above explained whether the radar is in the 10 or 3 cm. band. Let it be supposed to lie in the 10 cm. band and that the antenna involved is number 1. The antenna from which a signal is being observed can be identified by using the short sweep, of duration equal to the total delay of line 54, without introduction of delay at line 64, and by noting the position of the resultant pip along axis 57.

By operation of the appropriate button, say $101_1$ for antenna 1, the oscillator 100 is energized, and this feeds the antenna 90. The frequency of the oscillator is varied by means of the control 102. The crystal detector 11 then operates as a mixer, and its sensitivity is considerably increased so that the height of the pip on the screen suddenly increases when the frequency of the locally generated signal becomes equal to that of the radar under observation. It is thus possible to determine this frequency with a precision better than 1 megacycle per second.

While the invention has been described in terms of a preferred embodiment, numerous variations and modifications thereof may be made within the scope of the invention as set forth in the appended claims. For example the receiver of the invention may be constructed for simultaneous observation of less than the complete horizon, by the provision of a smaller number of antennas whose overlapping patterns cover less than 360°. Neither is the invention restricted to the use of any particular number of antennas for covering a particular portion of the horizon, whether 360° or less. Provided the antennas are rotatably mounted, as in the preferred embodiment of the invention which has been described, the receiver may also be employed without calibration means on the cathode-ray tube face in the indicator, bearings being determined by rotating the antennas together until the signals received on two adjacent antennas appear at equal amplitudes on the indicator so that the difference in height between the two signals is zero. The target bearing is then, for the eight-antenna embodiment described, 22½° from the axes of the two antennas involved. Receivers according to the invention and bearing determinations according to the method of the invention may also be made with adjacent antennas having overlapping patterns even though they are not so oriented that the axis of the pattern of one is tangent to the pattern of the next, as it is in the preferred embodiment which has been described.

I claim:
1. A direction-finding radio receiver for determining the bearing of microwave radio signals of the pulsed type, said receiver comprising a plurality of microwave receiving antennas having similar directivity characteristics, means to mount said antennas in a fan-shaped array in such relative positions that the axis of the horizontal pattern of each is substantially tangent to the pattern of the adjacent antenna in said array at the base thereof, means to rotate said mounting means about a vertical axis through at least half the angle of said pattern at the base thereof, and indicator means for presenting side by side on a cathode-ray tube after detection and substantially equal amounts of amplification pulses of microwave energy received by two adjacent antennas of said array.

2. A direction-finding radio receiver for determining the bearing of microwave radio signals of the pulsed type, said receiver comprising a plurality of microwave receiving antennas having similar directivity characteristics, means to mount said antennas in a fan-shaped array in such relative positions that the axis of the horizontal pattern of each is substantially tangent to the pattern of the adjacent antenna in said array at the base thereof, means to rotate said mounting means about a vertical axis through at least half the angle of said pattern at the base thereof, a detector coupled to each of said antennas, a separate vacuum tube amplifier coupled to each of said detectors, cathode-ray tube indicator including a sweep generator circuit, means coupling an output terminal of each of said separate amplifiers in parallel with said generator circuit, a delay line having at least one section for each of said antennas, means coupling an output terminal from each of said separate amplifiers to one of said sections whereby the antennas of said array are coupled to said delay line at sections progressively farther from one end of said delay line, a video amplifier coupled between said end of said delay line and said indicator for deflection of the cathode-ray beam therein in a direction transverse to the direction in which said beam is deflected by said sweep generator circuit, and calibration means associated with said indicator whereby the difference in height between a pulse signal as received by two adjacent antennas of said array and as presented on said indicator may be interpreted as a measure of the angle between the bearing of the source of said pulse with respect to the receiver and the bearing on which the patterns of said two antennas intersect.

3. A direction-finding radio receiver for determining the bearing of microwave radio signals of the pulsed type, said receiver comprising a plurality of microwave receiving antennas having similar directivity characteristics, means to mount said antennas in a fan-shaped array in such relative positions that the axis of the horizontal pattern of each is substantially tangent to the pattern of the adjacent antenna in said array at the base thereof, means to rotate said mounting means about a vertical axis through at least half the angle of said pattern at the base thereof, a detector coupled to each of said antennas, a separate vacuum tube amplifier coupled to each of said detectors, a cathode-ray tube indicator including a sweep generator circuit, means including a first variable delay line coupling an output terminal of each of said separate amplifiers in parallel with said generator circuit, a second delay line having at least one section for each of said antennas, means coupling an output terminal from each of said separate amplifiers to one of said sections whereby the antennas of said array are coupled to said second delay line at sections progressively farther from one end of said second delay line, a video amplifier having variable gain coupled between said end of said second delay line and said indicator for deflection of the cathode-ray beam therein in a direction transverse to the direction in which said beam is deflected by said sweep generator circuit, and calibration means for reading the difference in height on said indicator between pulse-shaped signals from two adjacent antennas of said array as a measure of the departure of the angle between the bearing of the source of said signals with respect to the receiver and the bearing on which the patterns of said two antennas intersect, with said video amplifier adjusted to give to the larger signal a standard amplitude.

4. A direction-finding radio receiver for microwaves comprising a plurality of substantially identical microwave antennas, means to mount said antennas with the axes of their directivity patterns in the horizontal plane inclined to each other successively by one-half the maximum angle of said patterns, a detector coupled to each of said antennas, a plurality of individual amplifiers of adjustable gain coupled each to one of said detectors, a sweep generator circuit coupled to an output terminal of each of said amplifiers in parallel, a video amplifier of adjustable gain, means coupling an output terminal of each of said individual amplifiers to said video amplifier over a transmission line introducing a delay characteristic to each such antenna, a cathode-ray tube having two pairs of perpendicularly disposed deflection plates of which one pair is connected to the output of said sweep generator circuit and of which the other pair is connected to the output of said video amplifier, and calibration means for reading the difference in height on said cathode-ray tube between pulse-shaped signals derived from adjacent antennas of said plurality as a measure of the angle between the bearing of the source of said signals with respect to the receiver and the bearing on which the patterns of said adjacent antennas intersect, with said video amplifier adjusted to give to the larger signal a standard amplitude.

5. A direction-finding radio receiver for the detection of pulsed microwave transmitters over 360° of bearing with respect to the receiver, said receiver comprising a plurality of substantially identical directive microwave receiving antennas mounted in a horizontal circular array with the axes of their patterns in the horizontal plane inclined to each other successively by one-half their maximum beam angle in the horizontal plane, said maximum beam angle being substantially equal to 360° divided by one-half said plurality whereby all bearings on the horizon intersect the patterns of two adjacent antennas except the bearings which coincide with the axes of said patterns, means to rotate said array about a vertical axis through an angle of at least half of said maximum beam angle, a detector coupled to each of said antennas, an adjustable individual amplifier coupled to each of said detectors, a cathode-ray tube indicator including a sweep generator capable of producing sweeps shorter and longer than the pulse cycle of said transmitters, means coupling an output terminal of each of said amplifiers to said sweep generator in parallel, said last named means including means to insert a variable time delay of maximum value at least as great as the duration of said shorter sweep, a video amplifier of adjustable gain having its output coupled to said indicator for deflection of the cathode-ray beam therein in a direction transverse to the direction of said sweeps, means coupling an output terminal of each of said individual amplifiers to said video amplifier over a transmission line introducing a delay which for the successive antennas of said array increases in uniform steps to a maximum equal to said shorter sweep length whereby upon operation of said indicator with said shorter sweep the position along said sweep at which received signals appear serves as an identification of the antennas on which they are received, and calibration means associated with said indicator relating the difference in height between signals as received from any two adjacent antennas of said plurality with the angle between the source of said signals and the receiver and the bearing on which intersect the patterns of said two adjacent antennas.

6. A direction-finding radio receiver for determining the bearing of pulsed radar transmitters, said receiver comprising two groups of at least two microwave antennas of each group having similar frequencies and directivity characteristics, the antennas of the two groups being adapted to receive energy in different frequency ranges, means supporting the antennas of each of said groups in a horizontal array with the axis of the horizontal pattern of each antenna oriented with respect to the axis of the horizontal pattern of the adjacent antenna of the same group at an inclination substantially equal to one-half the maximum angle of the pattern of said adjacent antenna, a cathode-ray tube indicator, and means including a detector coupling each of said antennas with said indicator, the detectors coupled in the antennas of one of said groups being reversely poled with respect to the detectors coupled to the antennas of the other group.

7. A direction-finding radio receiver for determining the bearing of pulsed radar transmitters, said receiver comprising two groups of at least two microwave antennas each, the antennas of the two groups being receptive to energy in different frequency ranges, the antennas of each group having similar frequency and directivity characteristics, means supporting the antennas of said two groups in two relatively fixed horizontal arrays with the axis of the horizontal directivity pattern of each antenna inclined to the corresponding axis of the adjacent antenna of the same group by an angle substantially equal to one-half the maximum beam angle of the pattern of said adjacent antenna, a cathode-ray tube indicator, and a detector coupled between each of said antennas and said indicator, the detectors coupled to the antennas of one of said groups being reversibly poled with respect to the detectors coupled to the antennas of the other group.

8. A direction-finding radio receiver for the detection of pulsed microwave transmissions lying in two frequency bands and disposed over the whole horizon, said receiver comprising two equally numerous groups of directive microwave antennas receptive to energy in different frequency bands, said antennas having similar directivity characteristics, means to mount the antennas of said groups in two arrays with the axes of their horizontal directivity patterns equiangularly disposed over 360° as to each array, said antennas having symmetrical horizontal directivity patterns whose maximum angle is equal to twice the angular separation of two adjacent antennas within either of said arrays, a crystal detector coupled to each of said antennas, the crystals coupled to the antennas of one array being reversely poled with respect to those coupled to the antennas of the other array, an equally numerous plurality of individual vacuum tube amplifiers, means coupling said detectors in pairs to said amplifiers, the detectors of each of said pairs being coupled each to an antenna in each of said arrays, a cathode-ray tube indicator including a sweep circuit capable of generating sweeps of different lengths, a video amplifier of variable gain coupled to said indicator for deflection of the cathode-ray beam therein in a direction transverse to the direction of said sweeps, means coupling each of said amplifiers to said video amplifier over a transmission line including a delay increasing progressively for the antennas of said arrays, means to introduce a variable delay coupling between all of said individual amplifiers and said sweep generator, a loudspeaker coupled to an output of all of said individual amplifiers, calibration means associated with said indicator whereby the difference in height between a pulse signal as received by two adjacent antennas in one of said arrays may be interpreted as a measure of the angle between the bearing of the source of said signal with respect to the receiver and the bearing on which the patterns of said two antennas intersect, two low-powered variable frequency oscillators operable one in each of said frequency bands, and means to radiate energy from each of said oscillators in the receiver of the antennas of said arrays receptive to energy in said frequency bands respectively.

9. A radio receiver for determining the carrier frequency of a pulsed radar transmitter, said receiver comprising a microwave antenna, a detector coupled to the antenna, a video amplifier connected to the output of said detector, a cathode-ray tube indicator coupled to the output of said video amplifier, a radio frequency oscillator of low power, means to vary the frequency of said oscillator, and means to radiate energy from said oscillator in the vicinity of said antenna.

References Cited
UNITED STATES PATENTS

| | | | |
|---|---|---|---|
| 2,361,436 | 10/1944 | Taylor | 343—115 |
| 2,422,122 | 6/1947 | Norton | 343—116 |
| 2,448,041 | 8/1948 | Marchand | 343—120 |
| 2,449,978 | 9/1948 | Clark | 343—120 |
| 2,452,546 | 11/1948 | Busignies et al. | 343—116 |
| 2,487,759 | 11/1949 | Kircher | 343—114.5 |
| 2,489,304 | 11/1949 | Marchand et al. | 343—120 |

RODNEY D. BENNETT, JR., Primary Examiner

HERBERT C. WAMSLEY, Assistant Examiner

U.S. Cl. X.R.

324—79; 343—115, 119

UNITED STATES PATENT OFFICE
CERTIFICATE OF CORRECTION

Patent No. 3,465,342     Dated September 2, 1969

Inventor(s) Bernard M. Delapalme

It is certified that error appears in the above-identified patent and that said Letters Patent are hereby corrected as shown below:

Column 3, line 4, for "atenna" substitute --antenna--;
           line 20, for "8-88" substitute --81-88--.
Column 7, line 18, insert --a-- before "cathode-ray".
Column 8, line 65, after "tennas" insert --each, the antennas--.
Column 9, line 1, for "in" substitute --to--.

SIGNED AND SEALED
JAN 27 1970

(SEAL)
Attest:

Edward M. Fletcher, Jr.
Attesting Officer

WILLIAM E. SCHUYLER, JR.
Commissioner of Patents